US011071039B2

(12) United States Patent
Fallon et al.

(10) Patent No.: US 11,071,039 B2
(45) Date of Patent: Jul. 20, 2021

(54) TECHNIQUES FOR GENERATING A ROUTING TABLE FOR A MESH NETWORK HAVING AD HOC CONNECTIONS

(71) Applicant: INTEL CORPORATION, Santa Clara, CA (US)

(72) Inventors: Michael F. Fallon, Tiverton, RI (US); Matthew J. Adiletta, Bolton, MA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/534,604

(22) Filed: Aug. 7, 2019

(65) Prior Publication Data

US 2020/0213932 A1    Jul. 2, 2020

Related U.S. Application Data

(63) Continuation of application No. 14/314,955, filed on Jun. 25, 2014, now abandoned.

(51) Int. Cl.
| | |
|---|---|
| *H04W 40/24* | (2009.01) |
| *H04W 84/18* | (2009.01) |
| *H04L 12/741* | (2013.01) |
| *H04W 40/04* | (2009.01) |
| *H04W 40/20* | (2009.01) |
| *H04L 12/717* | (2013.01) |
| *H04W 40/10* | (2009.01) |

(52) U.S. Cl.
CPC ............ *H04W 40/24* (2013.01); *H04L 45/54* (2013.01); *H04W 40/04* (2013.01); *H04W 40/10* (2013.01); *H04W 40/246* (2013.01); *H04W 84/18* (2013.01); *H04L 45/42* (2013.01); *H04W 40/20* (2013.01); *Y02D 30/70* (2020.08)

(58) Field of Classification Search
CPC ..... H04W 40/24; H04W 40/04; H04W 40/10; H04W 40/246; H04W 84/18; H04W 40/20; H04L 45/54; H04L 45/42; Y02D 70/1264; Y02D 70/1224; Y02D 70/142; Y02D 70/146; Y02D 70/22; Y02D 70/326; Y02D 70/38; Y02D 70/1262; Y02D 70/32; Y02D 70/1244; Y02D 70/164; Y02D 70/1242; Y02D 70/1246
See application file for complete search history.

(56) References Cited

U.S. PATENT DOCUMENTS

| | | | | |
|---|---|---|---|---|
| 7,843,822 | B1 * | 11/2010 | Paul | H04L 41/0816 370/230 |
| 8,111,622 | B2 * | 2/2012 | Cohen | H04W 40/18 370/236 |
| 2002/0090949 | A1 * | 7/2002 | Stanforth | H04W 40/10 455/445 |

(Continued)

*Primary Examiner* — Christopher M Crutchfield
*Assistant Examiner* — Tito Q Pham
(74) *Attorney, Agent, or Firm* — Kacvinsky Daisak Bluni PLLC

(57) ABSTRACT

Examples may include a management authority for a software-define network (SDN) receiving telemetric data from wireless devices coupled together in a mesh network having one or more ad hoc connections between the wireless devices. The management authority may then generate a routing table based on the received telemetric data and provide a routing table for use by the wireless devices to route data within the mesh network or route data to a network coupled to the mesh network.

16 Claims, 13 Drawing Sheets

(56) References Cited

U.S. PATENT DOCUMENTS

| | | | | |
|---|---|---|---|---|
| 2010/0306320 A1* | 12/2010 | Leppanen | ............ | H04W 8/005 709/206 |
| 2011/0164518 A1* | 7/2011 | Daraiseh | ............... | H04L 45/125 370/252 |
| 2015/0188934 A1* | 7/2015 | Vasseur | ................. | G06N 20/00 726/23 |
| 2015/0341140 A1* | 11/2015 | Hui | .......................... | H04L 1/22 370/254 |
| 2016/0309392 A1* | 10/2016 | Agardh | ............... | H04W 40/026 |

* cited by examiner

Telemetric Data 213

| Identifier | Location Information | | | Device Characteristics | | | Connections | |
|---|---|---|---|---|---|---|---|---|
| 310 | 320 | 330 | 340 | 350 | 360 | 370 | 380 | 390 |
| ID | Coordinates | Velocity | Direction | Power Info. | Routing Workload | QoS Info. | Management Authority | External Network(s) |

FIG. 3

Routing Table 400

| | SDN 110 | ISP AP 130 | WWAN 140 | 120-1 | 120-3 | 120-4 | 120-5 | 120-6 | 120-n |
|---|---|---|---|---|---|---|---|---|---|
| 1st Extrnl | 125-2 (1) | - | - | - | - | - | - | - | - |
| 2nd Extrnl | - | - | 125-3 (3) | - | 121-6 (2) | - | 121-2 (1) | 123-2 (1) | - |
| 3rd Extrnl | - | 125-1 (3) | - | 121-1 (2) | - | - | 121-2 (1) | - | - |
| 120-1 | - | - | - | 121-1 (2) | - | - | - | - | - |
| 120-3 | - | - | - | - | 121-6 (2) | - | - | 123-2 (1) | - |
| 120-4 | - | - | - | - | - | 121-5 (2) | 121-2 (1) | - | - |
| 120-5 | - | - | - | - | - | - | 121-2 (1) | - | - |
| 120-6 | - | - | - | - | - | - | - | 123-2 (1) | - |
| 120-n | - | - | - | - | - | - | - | 123-2 (1) | 123-6 (2) |

Wireless Device 120-2

RECEIVE TELEMETRIC DATA AT A MANAGEMENT AUTHORITY FOR AN SDN, THE TELEMETRIC DATA RECEIVED FROM WIRELESS DEVICES COUPLED TOGETHER IN A MESH NETWORK HAVING ONE OR MORE AD HOC WLAN CONNECTIONS BETWEEN THE WIRELESS DEVICES, THE MESH NETWORK COUPLED TO THE MANAGEMENT AUTHORITY THROUGH AT LEAST ONE OF THE WIRELESS DEVICES
702

GENERATE A ROUTING TABLE TO DEFINE ONE OR MORE PATHS THROUGH THE ONE OR MORE AD HOC WLAN CONNECTIONS BASED, AT LEAST IN PART, ON THE TELEMETRIC DATA
704

SEND THE ROUTING TABLE TO AT LEAST ONE WIRELESS DEVICE COUPLED TO THE MESH NETWORK FOR USE TO ROUTE DATA WITHIN THE MESH NETWORK OR ROUTE DATA TO A FIRST NETWORK COUPLED TO THE MESH NETWORK
706

*FIG. 7*

Storage Medium 800

Computer Executable
Instructions for 700

ESTABLISH, AT CIRCUITRY FOR A FIRST WIRELESS DEVICE, A FIRST AD HOC WLAN CONNECTION WITH A SECOND WIRELESS DEVICE TO COUPLE TO A MESH NETWORK HAVING AT LEAST A THIRD WIRELESS DEVICE COUPLED TO THE SECOND WIRELESS DEVICE VIA A SECOND AD HOC WLAN CONNECTION
*1002*

RECEIVE ADDRESS INFORMATION TO COMMUNICATE TELEMETRIC DATA TO A MANAGEMENT AUTHORITY FOR A SOFTWARE-DEFINED NETWORK (SDN) COUPLED TO THE MESH NETWORK THROUGH AT LEAST ONE OF THE SECOND WIRELESS DEVICE OR THE THIRD WIRELESS DEVICE
*1004*

SEND TELEMETRIC DATA TO THE MANAGEMENT AUTHORITY BASED ON NEGOTIATED SESSION PARAMETERS
*1006*

RECEIVE A ROUTING TABLE GENERATED BY THE MANAGEMENT AUTHORITY, THE ROUTING TABLE BASED, AT LEAST IN PART, ON THE TELEMETRIC DATA, THE ROUTING TABLE FOR USE BY THE FIRST WIRELESS DEVICE TO ROUTE DATA WITHIN THE MESH NETWORK OR ROUTE DATA TO A FIRST NETWORK COUPLED TO THE MESH NETWORK THROUGH THE FIRST, THE SECOND OR THE THIRD WIRELESS DEVICE
*1008*

FIG. 10

Storage Medium 1100

Computer Executable
Instructions for 1000

*FIG. 11*

TECHNIQUES FOR GENERATING A ROUTING TABLE FOR A MESH NETWORK HAVING AD HOC CONNECTIONS

CROSS-REFERENCE TO RELATED APPLICATION

This application is a continuation of, claims the benefit of and priority to previously filed U.S. patent application Ser. No. 14/314,955 filed Jun. 25, 2014, entitled "Techniques for Generating a Routing Table for a Mesh Network Having Ad Hoc Connections", which is hereby incorporated by reference in its entirety.

TECHNICAL FIELD

Examples described herein are generally related to wireless communication devices in a mesh network.

BACKGROUND

A mobile ad hoc network (MANET) may include a plurality of wireless devices coupled together via wireless ad hoc connections to form a mesh network. As part of a mesh network, each wireless device may serve as an endpoint for the mesh network. A MANET may be a self-configuring, infrastructure-less mesh network interconnected via a wireless technology such as Wi-Fi™ using ad hoc wireless local access network (WLAN) connections. Building a MANET that is useful or effective may depend on maintaining efficient communication links or connections between wireless devices included in the mesh network as well as with devices of other, external networks. Mobility of at least some of the wireless devices included in the mesh network may result in a dynamic topology that may cause path(s) through the mesh network between endpoints to change with each movement. Since each wireless device serves as an endpoint, each wireless device needs to be made aware of these movements in order to route data and/or communications to other wireless devices in the mesh network or to devices of other, external networks.

Ad hoc routing protocols for routing communications and/or data through the mesh network may place high computational, network bandwidth or application message latency burdens on one or more of the wireless devices of the mesh network. Mobility of wireless devices included in the mesh network exasperates these burdens as that mobility causes the topology of the mesh network to be in constant flux.

BRIEF DESCRIPTION OF THE DRAWINGS

FIG. 3 illustrates example telemetric data.
FIG. 4 illustrates an example of a routing table.
FIG. 7 illustrates an example of a first logic flow.
FIG. 8 illustrates an example of a first storage medium.
FIG. 10 illustrates an example of a second logic flow.
FIG. 11 illustrates an example of a second storage medium.

DETAILED DESCRIPTION

Figure 1:
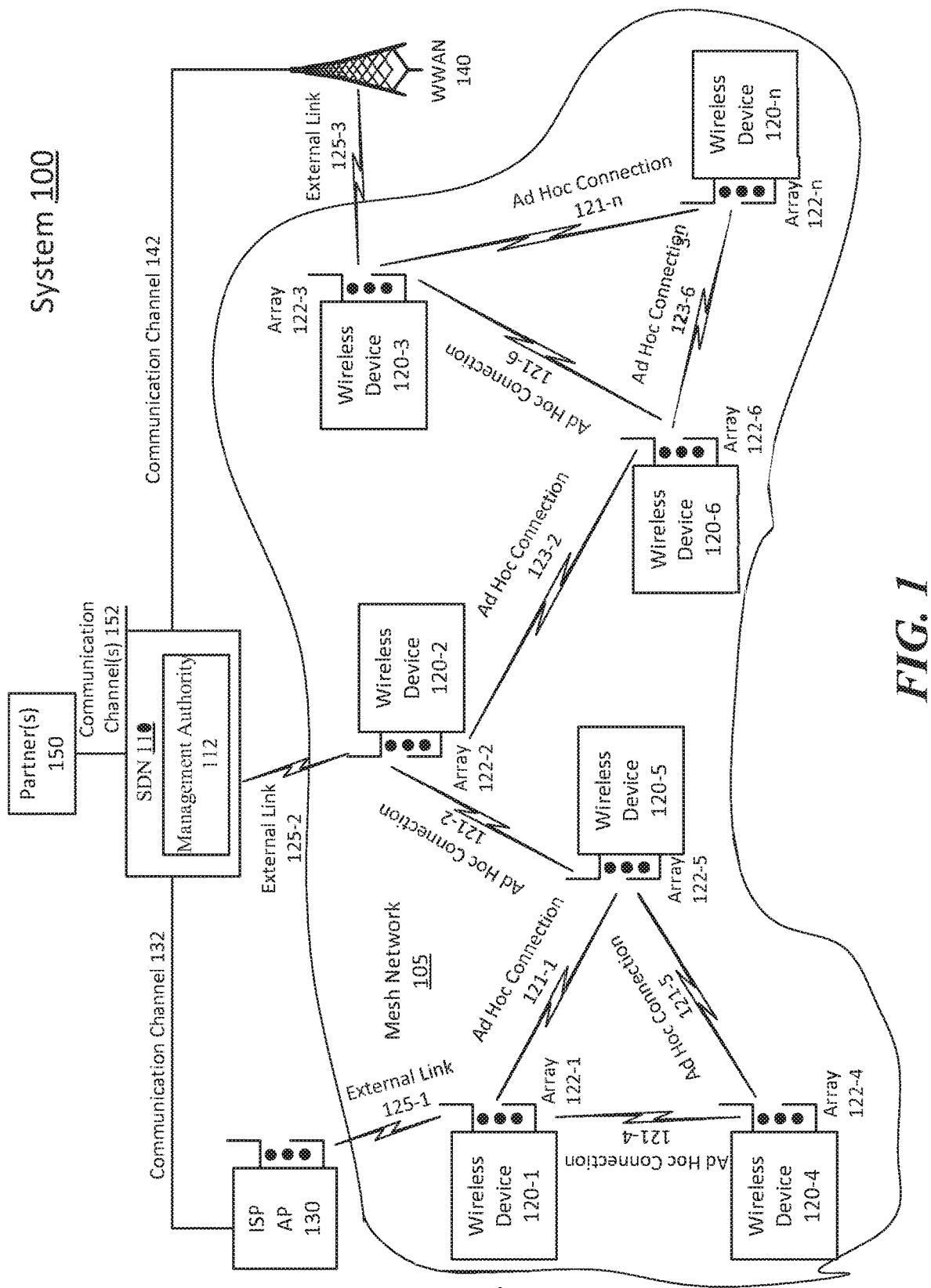
FIG. 1 illustrates an example of a first system.

Examples are generally directed to improvements for generating a routing table for a mesh network having ad hoc wireless local access network (WLAN) connections between wireless devices. These ad hoc WLAN connections may be established based on industry standards and/or specifications such as those promulgated by the Institute of Electrical Engineers (IEEE). For example IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11").

In some examples, one or more wireless devices of a mesh network having ad hoc WLAN connections may be capable of providing a connection outside of the mesh network. The connection outside of the mesh network may enable the mesh network to couple to an exterior network and/or a management authority and provide one or more network uplink or downlink paths for wireless devices included in the mesh network. These one or more wireless devices capable of providing the connection outside of the mesh network may use one or more wireless mobile telecommunication cellular or wireless mobile broadband technologies. Wireless mobile broadband technologies may include one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI), Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

As contemplated in the present disclosure, each wireless device of a MANET formed in a mesh network may serve as an endpoint. As an endpoint, each wireless device may need to be made aware of these movements in order to route data and/or communications to other wireless devices in the mesh network or to devices of other, external networks. However, ad hoc routing protocols for routing communications and/or data through the mesh network may place a high computational, network bandwidth or application message latency burden on these wireless devices. Mobility of wireless devices included in the mesh network exasperates these burdens as that mobility causes the topology of the mesh network to be in constant flux.

Some solutions attempt to mitigate these burdens. Table-driven (proactive) routing solutions such as a Better Approach to Mobile Ad Hoc Networking (B.A.T.M.A.N) and Optimized Link State Routing Protocol (OLSR) may have each wireless device, independent of network traffic needs, maintaining a fresh list of destinations and their routes by periodically determining and then distributing routing tables throughout the network. Main disadvantages of such solutions may be that they require large amounts of data and they may be slow to react to topology changes due to movement or connection failures between one or more wireless devices in the mesh network.

On-demand (reactive) routing solutions may include dynamic MANET on-demand routing described in such publications as Request for Comments (RFC): 4729, "The Dynamic Source Routing Protocol (DSR) for Mobile Ad Hoc Networks for IPv4", published February 2007 ("RFC 4729"). For RFC 4729, a required route may be determined on demand by flooding a MANET with route request packets. Main disadvantages of this solution may be that high latency results when attempting to find a required route and this may also cause excessive network traffic.

When wireless devices included in a MANET formed as a mesh network are battery powered, additional disadvantages of the above solutions may be that high computational burden and excessive network traffic can cause a wireless device's battery to lose a charge at an unacceptable rate. Also, it may be difficult to maintain some level of "fairness" in the MANET in that a single wireless device or subset of wireless devices may be unfairly and unintentionally burdened with routing a disproportionate percent of network traffic for other wireless devices. This may also have an unacceptable impact on the rate a burdened wireless device's battery loses a charge and also may reduce the burdened wireless device's responsiveness. It is with respect to these and other challenges that the examples described herein are needed.

According to some examples, techniques for generating a routing table for a mesh network having ad hoc connections may include implementing a first method. The first method may include receiving telemetric data at a management authority for a software-defined network (SDN). The telemetric data may be received from wireless devices coupled together in the mesh network that may have one or more ad hoc WLAN connections between the wireless devices. For this first method, the mesh network may be coupled to the management authority through at least one of the wireless devices. The first method may also include generating a routing table to define one or more paths through the one or more ad hoc WLAN connections based, at least in part, on the telemetric data. The first method may also include sending the routing table to at least one wireless device coupled to the mesh network for use to route data within the mesh network or route data to a first network coupled to the mesh network.

In some examples, the techniques for generating the routing table for the mesh network having ad hoc connections may also include implementing a second method. The second method may include establishing, at circuitry for a first wireless device, a first ad hoc WLAN connection with a second wireless device to couple to the mesh network having at least a third wireless device coupled to the second wireless device via a second ad hoc WLAN connection. The second method may also include receiving address information to communicate telemetric data to a management authority for an SDN coupled to the mesh network through at least one of the second wireless device or the third wireless device. The second method may also include sending telemetric data to the management authority based on negotiated session parameters. The second method may also include receiving a routing table generated by the management authority. For this second method, the routing table may be based on the telemetric data and may be for use by the first wireless device to route data within the mesh network or route data to a first network coupled to the mesh network through the first, the second or the third wireless device.

FIG. 1 illustrates an example system 100. System 100, as shown in FIG. 1, includes a software-defined network (SDN) 110 coupled to a mesh network 105 that includes a plurality of wireless devices 120-1 to 120-*n*, where "n" is any positive whole integer>6. As shown in FIG. 1 SDN 110 may couple to mesh network 105 directly via an external link 125-2 from wireless device 120-2. SDN 110 may also couple indirectly via an external link 125-1 from wireless device 120-1 through an Internet service provider (ISP) access point (AP) 130 and over a communication channel 132. SDN 110 may also couple indirectly via an external link 125-3 from wireless device 120-3 through a wireless wide area network (WWAN) 140 and over a communication channel 142. According to some examples, external links 125-1, 125-2 or 125-3 may be wireless links, while communication channels 132 or 142 may be wireless and/or wired communication channels. Examples are not limited, to a single wireless device having either a direct or indirect coupling to SDN 110 routed through an ISP AP or WWAN. Although not shown in FIG. 1, multiple wireless devices included in mesh network 105 may be capable of directly or indirectly coupling to SDN 110.

In some examples, as shown in FIG. 1, wireless devices 120-1 to 120-*n* may each have at least one ad hoc connection to at least one other wireless device that separately utilize each wireless device's respective array 122-1 to 122-*n* for transmitting or receiving wireless signals. For example, wireless device 120-1 utilizes array 122-1 to maintain ad hoc connections 121-1 and 121-4 to wireless devices 120-5 and 120-4, respectively. Also, for these examples, each of the wireless devices may be capable of serving as endpoints for mesh network 105 and thus may use a routing table to route data within mesh network 105. As mentioned previously, if a wireless device were tasked with generating a routing table for use to route data in mesh network 105, an excessive burden may be placed on the tasked wireless device or devices. According to some examples, as described more below, a management authority such as management authority 112 of SDN 110 may be utilized by wireless devices such as wireless devices 120-1 to 120-*n* to generate a routing table based on telemetric data received from these wireless devices. For these examples, the management authority may have a relatively large amount of available computing resources and may be augmented by location specific data or information that enables the management authority to generate the routing table based on received telemetric data.

According to some examples, the various ad hoc connections coupling wireless devices 120-1 to 120-*n* together may be ad hoc WLAN connections operated in compliance with one or more wireless communication standards associated with IEEE standards to include IEEE 802.11-2012. Also, external link 125-1 between wireless device 120-1 and ISP AP 130 may also be operated in compliance with IEEE 802.11-2012. External link 125-3, meanwhile, between wireless device 120-3 and WWAN 140 may be operated in compliance with one or more 3GPP LTE standards including LTE-A. Also, external link 125-2 between wireless device 120-2 and SDN 110 may be operated in compliance with IEEE 802.11-2012 and/or LTE-A. Although external links 125-1 to 125-3 are not limited to operating in compliance with standards such IEEE 802.11-2012 or LTE-A. Other wireless communication standards are contemplated.

In some examples, SDN 110 may also couple to one or more partner(s) 150 via a communication channel(s) 152. As described more below, partner(s) 150 may be capable of providing or augmenting one or more services that may be requested by wireless devices included in mesh network 105. In some examples, partner(s) 150 may include one or more cloud-based service partners that may or may not have service agreements with at least some of the wireless devices included in mesh network 105. Partner(s) 150, for example, may not have or require a service agreement if they provide a service in exchange for gathering cumulative or big data associated with providing the service that may have commercial value that may cover at least some of the costs of providing the service.

According to some examples, wireless devices 120-1 to 120-n may be any electronic device having wireless capabilities or equipment. For some examples, wireless devices 120-1 to 120-n may be implemented in a fixed or mobile device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location. However, this at least temporary mobility of a fixed device may still require a need to update a routing table that may have been based on the first fixed location.

Figure 2:
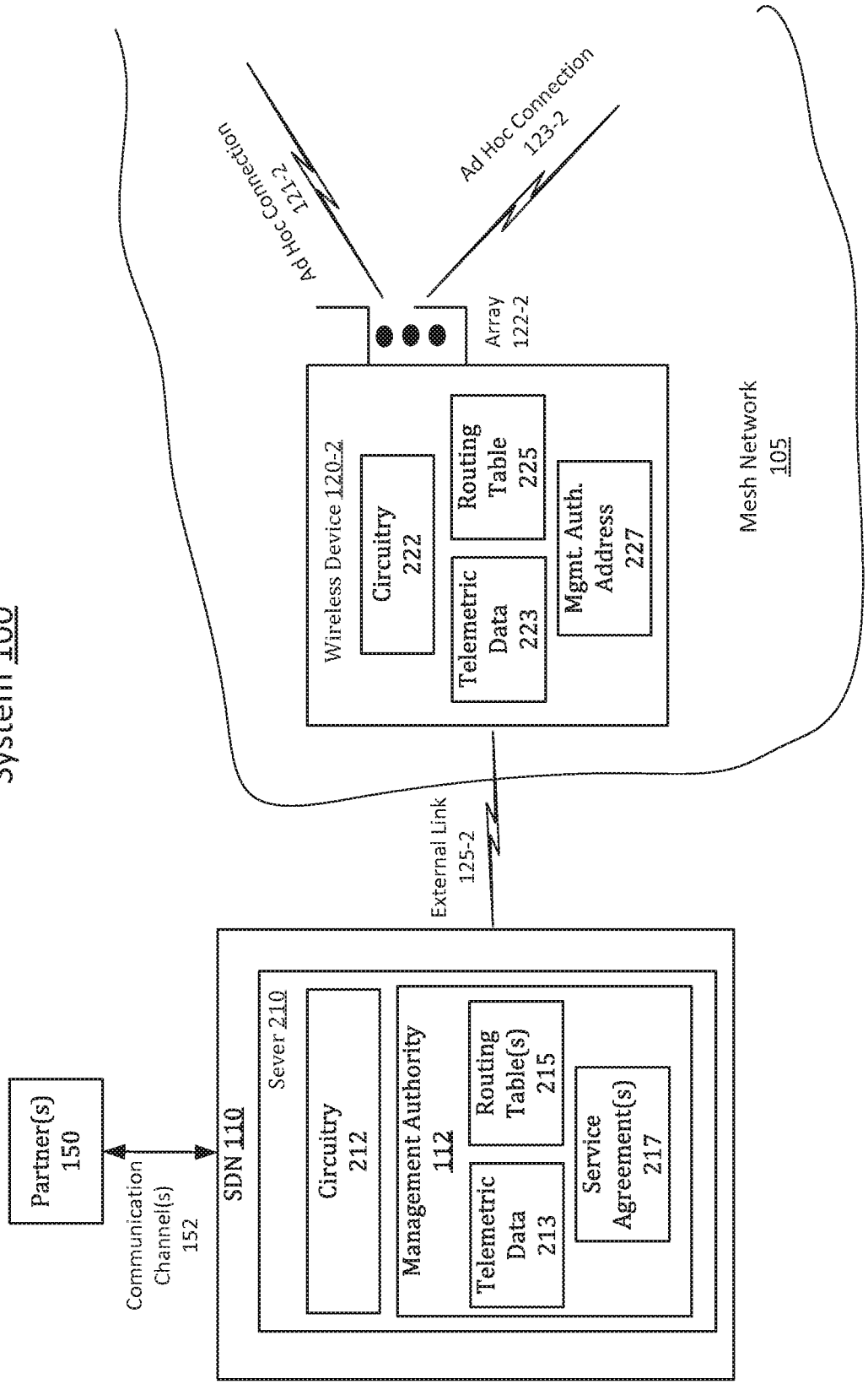
FIG. 2 illustrates an example of a second system.

FIG. 2 illustrates an example second view of system 100. As shown in FIG. 2, the example second view of system 100 includes SDN 100 having a server 210 via which management authority 112 may reside. In some examples, circuitry 212 may include host processing, memory or storage capabilities of server 210 for use by management authority 112 to provide a control plane for mesh network 105. Providing the control plane may include generation of routing table(s) 215 to define one or more paths through ad hoc connections between wireless devices included in mesh network 105 based on received telemetric data 213. Providing the control plane may also include management authority 112 being capable of one or more management functions including, but not limited to, central authentication and verification control for each wireless device to access mesh network 105 or access SDN 110, or virus scanning of data routed through the defined paths of mesh network 105. According to some examples, the one or more management functions may be based on service agreement(s) 217 between management authority 112 and wireless devices 122-1 to 122-n of mesh network 105.

In some examples, as shown in FIG. 2, the example second view of system 100 has wireless device 120-2 including circuitry 222, telemetric data 223, routing table 225 and management authority address 227. Circuitry 222 may include logic and/or features to enable wireless device 120-1 to at least establish ad hoc connections with other wireless devices (e.g., ad hoc connections 121-2 or 123-2), communicate with management authority 112, receive a routing table generated by management authority 112 or request/receive services routed through management authority 112 to partner(s) 150. Although not shown in FIG. 2, the other wireless devices of mesh network 105 shown in FIG. 1 may also include circuitry, telemetric data, a routing table and a management authority address to enable these other wireless devices implement similar function as mentioned above for wireless device 120-2.

FIG. 3 illustrates example telemetric data. As shown in FIG. 3, the example telemetric data included in telemetric data 213 that may be gathered and/or maintained by management authority 112 of SDN 110. In some examples, as shown in FIG. 3, telemetric data 213 may include identifier, location information, device characteristics or connections gathered from wireless devices 122-1 to 122-n of mesh network 105.

According to some examples, identifier telemetric data may be included in field 310. For these examples, field 310 may indicate identifier information for each wireless device. The identifier information may be provided by each wireless device or may be assigned by management authority 112.

In some examples, location information may include, but is not limited to, fields 320, 330 and 340. Field 320 may include physical location information for each wireless device such as global positioning system (GPS) coordinates. Field 330 may include velocity information to indicate a rate of movement for each wireless device. Field 340 may include direction of movement information for each wireless device.

According to some examples, device characteristics may include, but are not limited to, fields 350, 360 and 370. Field 350 may include power information to indicate each wireless device's power source such as battery power or wall socket power. Field 360 may include a routing workload to indicate each wireless device's respective processing workload used to route data within or outside of the mesh network. Field 370 may include quality of service (QoS) information that may indicate QoS guarantees for each of the wireless devices associated with routing data. These QoS guarantees may be associated with service agreement(s) 217 between management authority 112 and respective wireless devices or may reflect QoS guarantees needed for an application implemented by these wireless devices such as streaming video applications. In some examples, management authority 112 may include logic and/or features capable of synchronizing a time between wireless devices in mesh network 105 to facilitate meeting respective QoS guarantees indicated in field 370.

In some examples, connections may include connections in fields 380 and 390. Field 380 may indicate how each wireless device is coupled or connected to management authority 112. For example, wireless device 120-2 is coupled directly to management authority 112 via external link 125-2 as shown in FIG. 1. Other wireless devices may either couple indirectly through wireless device 120-2 or indirectly through an external network such as through ISP AP 130 or WWAN 140. Field 390 may indicate which wireless device or wireless devices couple or connect to external networks such as those associated with ISP AP 130 or WWAN 140.

Examples are not limited to fields 310 to 390 for telemetric data gathered by management authority 112. More or less fields including similar or different telemetric data may be gathered and used by a management authority 112 to generate a routing table to be used by wireless devices 120-1 to 120-n of mesh network 105.

FIG. 4 illustrates an example routing table 400. According to some examples, as shown in FIG. 4, routing table 400 may define paths through ad hoc connections between wireless devices 120-1 to 120-n of mesh network 105 for use by wireless device 120-1 to route data within mesh network 105 or route data to a network coupled to mesh network 105. For example, a $1^{st}$ external path to SDN 110 may be routed directly to SDN 110 through external link 125-2. A $2^{nd}$ external path may be routed first to wireless device 120-6 via ad hoc connection 123-2 then secondly to wireless device 120-3 via ad hoc connection 121-6 and thirdly to WWAN 140 via external link 125-3. A $3^{rd}$ external path, may be routed first to wireless device 120-5 via ad hoc connection 121-2 then secondly to wireless device 120-1 via ad hoc connection 121-2 and thirdly to ISP AP 130 via external link 125-1.

Paths to other wireless devices within mesh network 105 are also shown in routing table 400. For example, a path to wireless device 120-1 may be routed first to wireless device 120-5 via ad hoc connection 121-2 then secondly to wireless device 120-1 via ad hoc connection 121-1.

According to some examples, routing table 400 may be generated based, at least in part, on telemetric data received from wireless devices 120-1 to 120-n. Routing table 400 may also be generated based on other types of information such as a fairness scheme that includes balancing respective processing workloads used by each of the wireless devices to route data within or outside of mesh network 105. For example, wireless device 120-1 may use a disproportionate amount of processing power to route data through its one external link 125-1 to ISP AP 130 and two ad hoc connections to wireless devices 120-4 and 120-5. Routing table 400 may be generated to balance the burden on wireless device 120-1 by having substantially equal numbers of wireless devices routing data through paths that go through all three external links coupled to mesh network 105. Also, for internal mesh network paths, a similar balancing may occur to avoid having some wireless devices having to use a disproportionate amount of processing power to route data via these internal mesh network paths.

In some examples, routing table 400 may also be generated based on information indicating physical terrain characteristics for physical locations of wireless devices 120-1 to 120-n. For these examples, physical terrain characteristics may include, but are not limited to, hills, mountains, vegetation coverage, types and/or sizes of buildings, bridges, railroads, tunnels or roads. The physical terrain characteristics may unequally impact quality of wireless signals for each wireless device. For example, if a large building or hill lies between two wireless devices, routing table 400 may select a path around the building or hill that is not the shortest distance between these two wireless devices.

According to some examples, other location-based information such as density of other wireless devices in the area that may not be part of mesh network 105 may impact the defined paths in routing table 400. For example, locations having a high density of wireless devices may cause substantial signal interference. Similar to routing around physical terrain, a path may be defined that routes around areas expected to have substantial signal interference at these locations.

Figure 5:
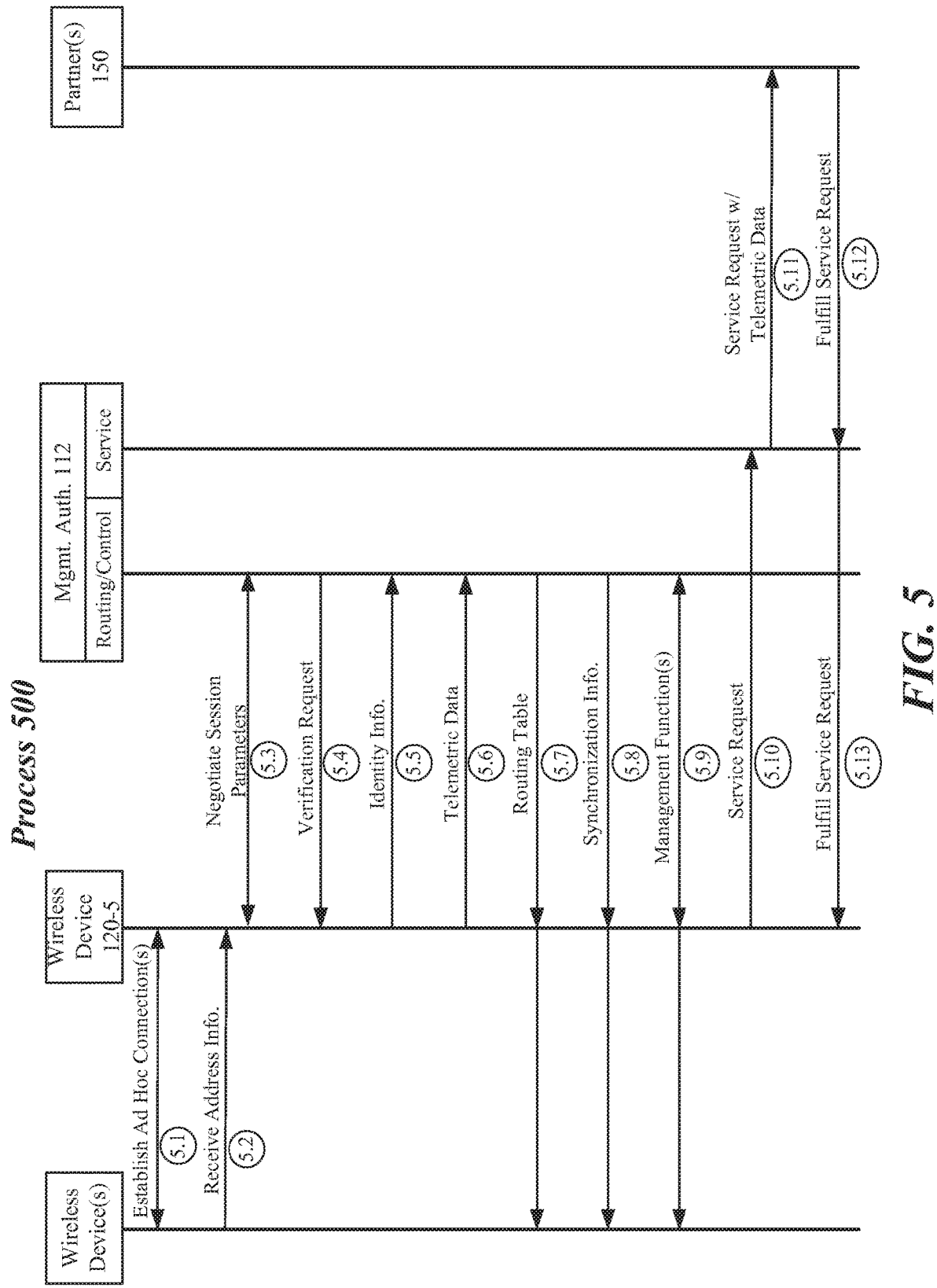
FIG. 5 illustrates an example process.

FIG. 5 illustrates an example process 500. In some examples, process 500 may be for a management authority to generate a routing table for use by a wireless device in a mesh network and also to receive service requests that may result use of one or more cloud-based partners to fulfill at least a portion of the service requests. For these examples, elements of system 100 as shown in FIG. 1 or 2 may be used to illustrate example operations related to process 500. Also, information included in telemetric data 213 or routing table 400 as shown in FIGS. 3 and 4 may be exchanged between these elements. However, the example process 500 is not limited to implementations using elements of system 100, telemetric data 213 or routing table 400 shown in FIGS. 1-4.

Beginning at process 5.1 (Establish Ad Hoc Connection), logic and/or features at wireless device 120-5 may establish ad hoc connections with other wireless devices included in mesh network 105. In some examples, the ad hoc wireless connections may include ad hoc WLAN connections established in compliance with IEEE 802.11-2012. For example, ad hoc WLAN connections may be established with wireless devices 120-1, 120-2 and 120-4. Establishing ad hoc WLAN connections may include wireless device 120-5 scanning mesh network 105 to identify these wireless devices as potential ad hoc WLAN connections and then authenticating each wireless device and/or mesh network 105 before establishing ad hoc WLAN connections to these wireless devices. According to some examples, authentication may be needed for security purposes.

Moving to process 5.2 (Receive Address Info.), logic and/or features at wireless device 120-5 may receive address information in order to communicate with management authority 112. In some examples, the received address information may result in wireless device 120-5 routing communications through wireless device 120-2 that is coupled to SDN 110 via external link 125-2. In other examples, the received address information may result in wireless device 120-5 routing communications through another wireless device that may couple to SDN 110 through an external network such as wireless device 120-1 coupled through ISP AP 130.

Moving to process 5.3 (Negotiate Session Parameters), logic and/or features at wireless device 120-5 may use the received address information to negotiate session parameters with logic and/or features at management authority 112 to establish a control plane with wireless device 120-5. In some examples, the negotiated session parameters may be based on using industry standards such as those associated with IEEE 802.11-2012 or 3GPP standards to include LTE-A. The negotiate session parameter may also determine a frequency and content of telemetric data to be received from wireless device 120-5 that may be used by management authority 112 to generate a routing table. According to some examples, the content of the telemetric data may include similar information has shown in FIG. 3 for telemetric data 213. The frequency that wireless device 120-5 sends the telemetric data may depend on such factors as mobility characteristics of wireless devices 120-1 to 120-n and/or processing power available to management authority 112 to receive telemetric data from wireless devices included in mesh network 105 or other mesh networks coupled to management authority 112.

Moving to process 5.4 (Verification Request), logic and/or features at management authority 112 may send a verification request to wireless device 120-5. In some examples, the verification request may be to verify whether wireless device 120-5 has a service agreement with management authority 112 before management authority 112 uses telemetric data received from wireless device 120-5 to generate and provide a routing table based on that received telemetric data.

Moving to process 5.5 (Identity Info.) logic and/or features at wireless device 120-5 may send identity information responsive to the verification request. According to some examples, logic and/or features at management authority 112 may then authenticate wireless device 120-5 based on the received identity matching an identity for a given wireless device having the identity provided by wireless device 120-5.

Moving to process 5.6 (Telemetric Data), logic and/or features at wireless device 120-5 may then send telemetric data to management authority 112 based on the negotiated session parameters.

Moving to process 5.7 (Routing Table), logic and/or features at management authority 112 may generate a routing table based on received or gathered telemetric data. In some examples, the telemetric data may have been gathered from one or more wireless devices included in mesh network 105. The routing table may be sent to wireless device 120-5 as well as other wireless device(s) of mesh network 105. For these examples, the received routing table may be used by wireless device 120-5 to route data within mesh network 105 or to networks coupled to mesh network 105. According to some examples, updated telemetric data may be sent by wireless device 120-5 based on the negotiated session parameters, an updated routing table may be generated based on the updated telemetric data and then disseminated to wireless device 120-5 as well as to the other wireless device(s) of mesh network 105.

Moving to process 5.8 (Synchronization Info.), logic and/or features at management authority 112 may be capable of sending synchronization information to wireless device 120-5 as well as the other wireless device(s) of mesh network 105. In some examples, the synchronization information may enable a time to be synchronized between wireless devices included in mesh network 105 to facilitate meeting QoS guarantees when routing data using the received routing table.

Moving to process 5.9 (Management Function(s)), logic and/or features at management authority 112 may be capable of providing one or more management functions to wireless device 120-5 as well as the other wireless device(s) of mesh network 105 through the control plane established at process 5.3. In some examples, the one or more management functions may include central authentication and verification control for each wireless device to access mesh network 105 or access SDN 110/management authority 112, or virus scanning of data routed through mesh network 105. For example, wireless device 120-5 as well as the other wireless device(s) of mesh network 105 may utilize these management functions to authenticate and verify additional wireless devices that may attempt to join mesh network 105. These one or more management functions, for example, may offload a considerable amount of processing power to management authority 112 from wireless device 120-5 and the other wireless devices that may otherwise have to be used to maintain an efficient and secure mesh network.

Moving to process 5.10 (Service Request), logic and/or features at wireless device 120-5 may be capable of sending a service request to management authority 112. In some examples, the service request may be based on telemetric data sent by wireless device 120-5 such as physical location information. For these examples, the service request may include, but is not limited to, one of locating a charging station to charge a battery for wireless device 120-5 (if battery powered), a surface route for wireless device 120-5 to travel to reach a given physical location or a physical location of vehicle parking located nearest to the physical location for wireless device 120-5.

Moving to process 5.11 (Service Request w/Telemetric Data), logic and/or features at management authority 112 may forward the service request along with relevant telemetric data to partner(s) 150 to facilitate in fulfilling the service request.

Moving to process 5.12 (Fulfill Service Request), partner(s) 150 may fulfill the service request. According to some examples, partner(s) 150 may include a near real-time satellite image provider that analyzes images of parking areas to discern vacant spots in proximity to a physical location of wireless device 120-5 indicated in the telemetric data.

Moving to process 5.13 (Fulfill Service Request), logic and/or features at management authority 112 forward information provided by partner(s) 150 to fulfill the service request.

Figure 6:
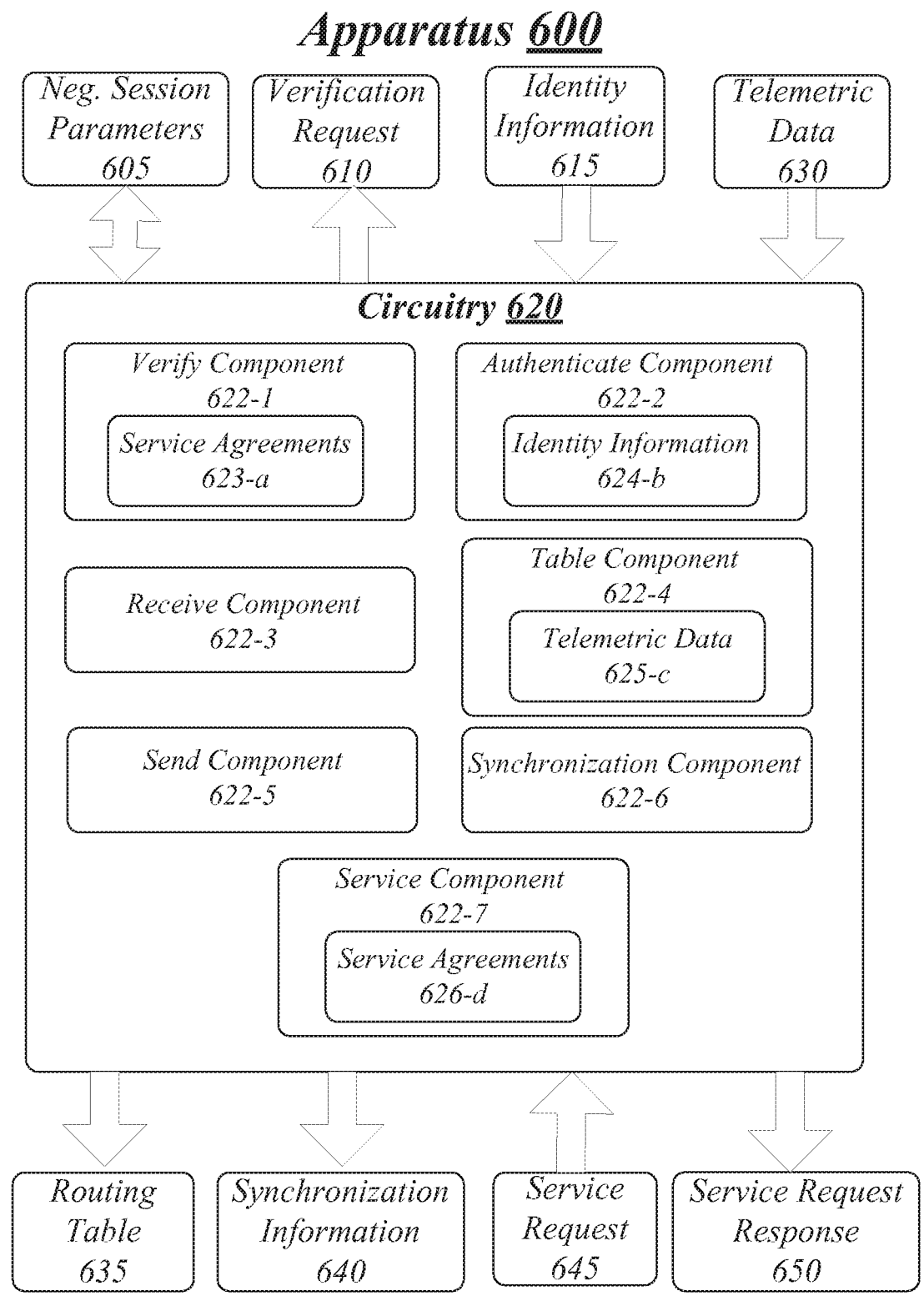
FIG. 6 illustrates an example block diagram for a first apparatus.

FIG. 6 illustrates a block diagram for an example first apparatus. As shown in FIG. 6, the example first apparatus includes apparatus 600. Although apparatus 600 shown in FIG. 6 has a limited number of elements in a certain topology, it may be appreciated that the apparatus 600 may include more or less elements in alternate topologies as desired for a given implementation.

The apparatus 600 may comprise a computer-implemented apparatus 600 having a circuitry 620 arranged to execute one or more software components 622-*a*. It is worthy to note that "a" and "b" and "c" and similar designators as used herein are intended to be variables representing any positive integer. Thus, for example, if an implementation sets a value for a=7, then a complete set of software components 622-*a* may include components 622-1, 622-2, 622-3, 622-4, 622-5, 622-6 and 622-7. The examples are not limited in this context.

According to some examples, apparatus 600 may be implemented in system equipment such as network equipment for a software-defined network (SDN). For example, apparatus 600 may be for a management authority of the SDN located at or with a server such as server 210 shown in FIG. 2.

In some examples, as shown in FIG. 6, apparatus 600 includes circuitry 620. Circuitry 620 may be generally arranged to execute one or more software components 622-*a*. circuitry 620 can be any of various commercially available processors, including without limitation an AMD® Athlon®, Duron® and Opteron® processors; ARM® application, embedded and secure processors; Qualcomm® Snapdragon, IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as circuitry 620. According to some examples, circuitry 620 may also be an application specific integrated circuit (ASIC) and at least some components 622-*a* may be implemented as hardware elements of the ASIC.

In some examples, apparatus 600 for a management authority may include a verify component 622-1. Verify component 622-1 may be executed by circuitry 620 to verify whether a wireless device from among a wireless devices coupled together in a mesh network having one or more ad hoc WLAN connections has a service agreement with the management entity. The mesh network, for example, may be coupled to the management authority through at least one of the wireless devices. For these examples, verify component 622-1 may send a verification request included in verification request 610 to the wireless device following negotiated session parameters 605 with the wireless device that may determine frequency and content of telemetric data to be received from the wireless device. Verify component 622-1 may be capable of maintaining or looking up service agreements with wireless devices via service agreements 623-a. Service agreements 623-a may be located in a data structure such as a lookup table (LUT) that may be maintained or accessible to verify component 622-1.

In some examples, apparatus 600 may also include an authenticate component 622-2. Authenticate component 622-2 may be executed by circuitry 620 to authenticate an identity of the wireless device that matches an identity for a given wireless device having the service agreement with the management authority responsive to receiving identity information 615 from the wireless device. Authenticate component 622-2 may be capable of maintaining or looking up wireless device identifies via identity information 624-b. Identity information 624-b may be located in a data structure such as a LUT that may be maintained or accessible to authenticate component 622-2 to determine whether the identity of the wireless device matches the identity for the given wireless device having the service agreement.

According to some examples, apparatus 600 may also include a receive component 622-3. Receive component 622-3 may be executed by circuitry 620 to receive telemetric data from the wireless devices coupled together in the mesh network. For these examples, the received telemetric data may be included in telemetric data 635 and may include telemetric data received from the verified and authenticated wireless device.

According to some examples, apparatus 600 may also include a table component 622-4. Table component 622-4 may be executed by circuitry 620 to generate a routing table to define one or more paths through the one or more ad hoc WLAN based on telemetric data received from the wireless devices coupled together in the mesh network. For these examples, telemetric data 625-c may be maintained by table component 622-4 (e.g., in a LUT) and may include the telemetric data 630 received from verified and authenticated wireless devices.

In some examples, apparatus 600 may also include a send component 622-5. Send component 622-5 may be executed by circuitry 620 to send the routing table generated by table component 622-4 to at least one wireless device coupled to the mesh network for use to route data within the mesh network or route data to a first network coupled to the mesh network. The generated routing table may be included in routing table 635.

In some examples, apparatus 600 may also include a synchronization component 622-6. Synchronization component 622-5 may be executed by circuitry 620 to synchronize a time between the wireless devices to facilitate meeting respective QoS guarantees for each of the wireless devices. For these examples synchronization information 640 may be sent to the wireless devices to synchronize the time between the wireless devices.

According to some examples, apparatus 600 may also include a service component 622-5. Service component 622-5 may be executed by circuitry 620 to receive a service request included in service request 645 from a wireless device from among the wireless devices of the mesh network. Service component 622-5 may be capable with or without assistance from partners to fulfill the request in a service request response 650 based on at least some of the telemetric data received from the wireless device.

In some examples, service component 622-7 may be capable of maintaining or looking up additional service agreements for providing services via service agreements 626-d. Service agreements 626-d may be located in a data structure such as a LUT that may be maintained or accessible to service component 622-7. For these examples, service component 622-7 may either fulfill or not fulfill the service request included in service request 645 based on whether the wireless device has a service agreement for that service request.

Various components of apparatus 600 and a device implementing apparatus 600 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 7 illustrates an example of a logic flow 700. Logic flow 700 may be representative of some or all of the operations executed by one or more logic, features, or devices described herein, such as apparatus 600. More particularly, logic flow 700 may be implemented by verify component 622-1, authenticate component 622-2, receive component 622-3, table component 622-4 or send component 622-5.

In the illustrated example shown in FIG. 7, logic flow 700 at block 702 may receive telemetric data at a management authority for an SDN, the telemetric data received from wireless devices coupled together in a mesh network having one or more ad hoc WLAN connections between the wireless devices, the mesh network coupled to the management authority through at least one of the wireless devices. For these examples, receive component 622-3 may receive the telemetric data following verification and authentication of wireless devices sending the telemetric data. Verify component 622-1 and authenticate 622-2 may be capable of respectively verifying and authenticating these wireless devices.

According to some examples, logic flow 700 at block 704 may generate a routing table to define one or more paths through the one or more ad hoc WLAN connections based, at least in part, on the telemetric data. For these examples, table component 622-4 may generate the routing table.

In some examples, logic flow 700 at block 706 may send the routing table to at least one wireless device coupled to the mesh network for use to route data within the mesh network or route data to a first network coupled to the mesh network. For these examples, send component 622-5 may cause the routing table to be sent to the at least one wireless device. The at least one wireless device may then cause the routing table to be disseminated to other wireless devices in the mesh network.

FIG. 8 illustrates an embodiment of a storage medium 800. The storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
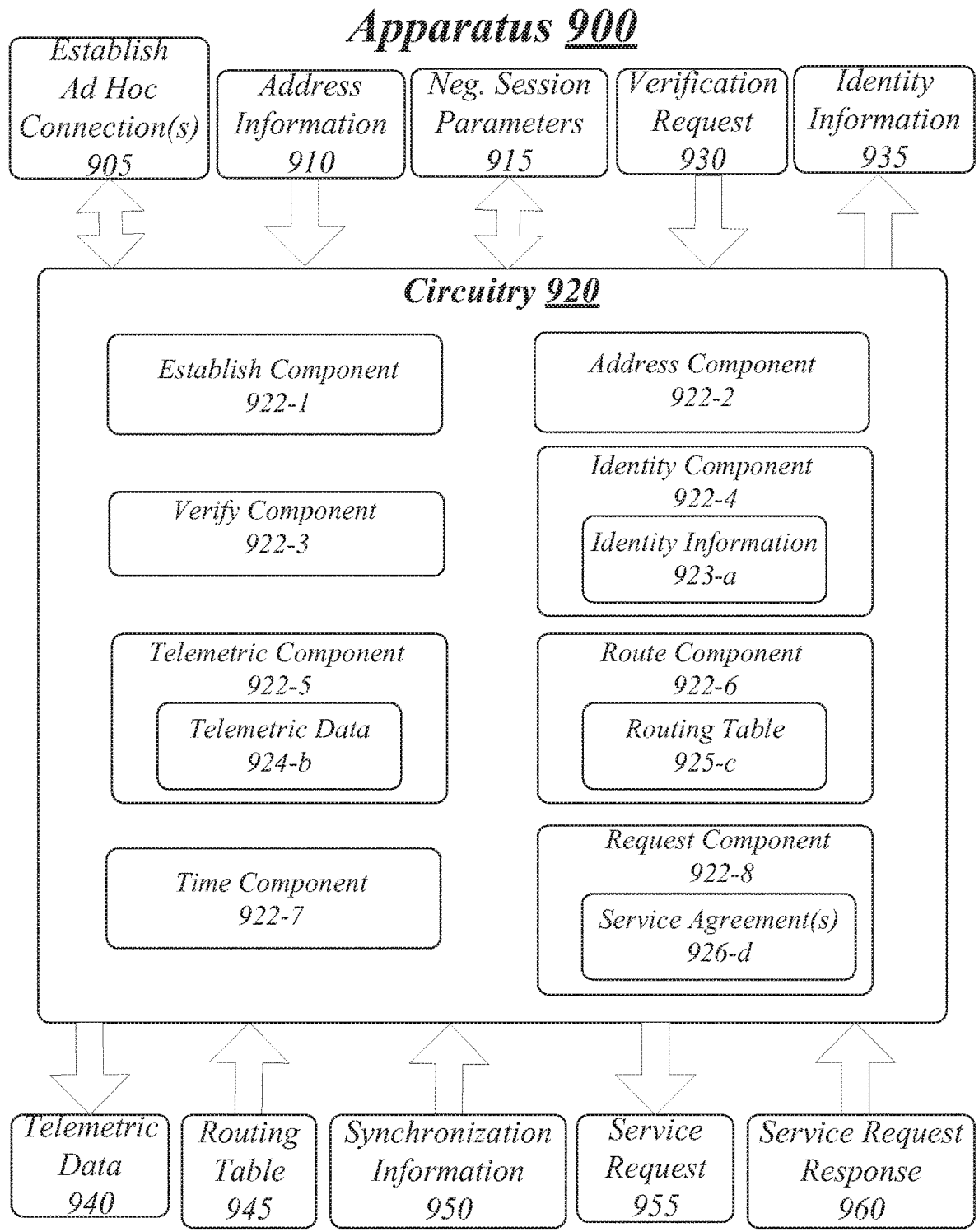
FIG. 9 illustrates an example block diagram for a second apparatus.

FIG. 9 illustrates a block diagram for an example second apparatus. As shown in FIG. 9, the example second apparatus includes apparatus 900. Although apparatus 900 shown in FIG. 9 has a limited number of elements in a certain topology, it may be appreciated that the apparatus 900 may include more or less elements in alternate topologies as desired for a given implementation.

The apparatus 900 may comprise a computer-implemented apparatus 900 having a circuitry arranged to execute one or more software components 922-$a$. It is worthy to note that "a" and "b" and "c" and similar designators as used herein are intended to be variables representing any positive integer. Thus, for example, if an implementation sets a value for a=8, then a complete set of software components 922-$a$ may include components 922-1, 922-2, 922-3, 922-4, 922-5, 922-6, 922-7 and 922-8. The examples are not limited in this context.

According to some examples, apparatus 900 may be implemented in a first wireless device (e.g., wireless devices 120-1 to 120-$n$) capable of operating in compliance with one or more 3GPP LTE Specifications or IEEE 802.11-2012 Standards and coupling to other wireless devices in a mesh network, coupling to networks external to the mesh network, or couple to an SDN having a management authority. The examples are not limited in this context.

In some examples, as shown in FIG. 9, apparatus 900 includes circuitry. Circuitry may be generally arranged to execute one or more software components 922-$a$. Circuitry 920 can be any of various commercially available processors to include but not limited to the processors mentioned above for apparatus 600. Also, according to some examples, circuitry may also be an ASIC and at least some components 922-$a$ may be implemented as hardware elements of the ASIC.

According to some examples, apparatus 900 may include an establish component 922-1. Establish component 922-1 may be executed by circuitry to establish a first ad hoc WLAN connection with a second wireless device to couple to a mesh network having at least a third wireless device coupled to the second wireless device via a second ad hoc WLAN connection. For these examples, as shown in FIG. 9, establish ad hoc connection(s) 905 may include establishing the first ad hoc WLAN connection with the second wireless device.

In some examples, apparatus 900 may also include an address component 922-2. Address component 922-2 may be executed by circuitry to receive address information to communicate telemetric data to a management authority for an SDN coupled to the mesh network through at least one of the second wireless device or the third wireless device. For these examples, the address information included in address information 910 may be received by address component 922-2 from the second or third wireless device responsive to a request message sent from the first wireless device following establishment of the first ad hoc WLAN connection by establish component 922-1.

According to some examples, apparatus 900 may also include a verify component 922-3. Verify component 922-3 may be executed by circuitry to receive a verification request from the management authority to determine whether the first wireless device has a service agreement with the management authority. For these examples, the verification request may be included in verification request 930 and may be received following negotiated session parameters 915 with the management authority that may determine frequency and content of telemetric data to be sent to the management authority.

In some examples, apparatus 900 may also include an identity component 922-4. Identity component 922-4 may be executed by circuitry to send identity information via identity information 935 responsive to the verification request from the management authority. For these examples, identity component 922-4 may be capable of maintaining identity information in identity information 923-$a$. Identity information 923-$a$ may be located in a data structure such as a LUT that may be maintained or accessible to identity component 922-4.

According to some examples, apparatus 900 may also include a telemetric component 922-5. Telemetric component 922-5 may be executed by circuitry to send telemetric data to the management authority based on the negotiated session parameters. For these examples, telemetric component 922-5 may be capable of maintaining or accessing telemetric data in telemetric data 924-$b$ to send telemetric data 940 to the management authority. Telemetric data 924-$b$ may be located in a data structure such as a LUT that may be maintained or accessible to telemetric component 922-5.

In some examples, apparatus 900 may also include a route component 922-6. Route component 922-6 may be executed by circuitry to receive a routing table generated by the management authority. The routing table may be based, at least in part, on the telemetric data sent by telemetric component 922-5. The routing table may be included in routing table 945 and may be for use by the first wireless device to route data within the mesh network or route data to a first network coupled to the mesh network through the second or the third wireless device. For these examples, routing component 922-6 may be capable of maintaining the routing table in routing table 925-c. Routing table 925-c may be located in a data structure such as a LUT that may be maintained or accessible to routing component 922-6.

According to some examples, apparatus 900 may also include a time component 922-7. Time component 922-7 may be executed by circuitry to synchronize a time with at least one of the second wireless device or the third wireless device based on time synchronization information included in synchronization information 950 that originated from the management authority. For these examples, the synchronized time may be for use by the first wireless device to meet a QoS guarantee to route data within the mesh network.

In some examples, apparatus 900 may also include a request component 922-8. Request component 922-8 may be executed by circuitry to send a service request included in service request 955 for a service provided by the management authority. For these examples, request component 922-8 may receive a response in service request response 960 based on at least some of the telemetric data sent to the management authority by telemetric component 922-5. For these examples, request component 922-8 may be capable of maintaining or accessing service agreements in service agreements 926-d to determine what services may be requested from the management authority. Service agreements 926-d may be located in a data structure such as a LUT that may be maintained or accessible to request component 922-8.

Various components of apparatus 900 and a device implementing apparatus 900 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 10 illustrates an example of a logic flow 1000. Logic flow 1000 may be representative of some or all of the operations executed by one or more logic, features, or devices described herein, such as apparatus 900. More particularly, logic flow 1000 may be implemented by establish component 922-1, address component 922-2, telemetric component 922-5 or route component 922-6.

In the illustrated example shown in FIG. 10, logic flow 1000 at block 1002 may establish, at circuitry for a first wireless device, a first ad hoc WLAN connection with a second wireless device to couple to a mesh network having at least a third wireless device coupled to the second wireless device via a second ad hoc WLAN connection. For these examples, establish component 922-1 may establish the first ad hoc WLAN connection.

According to some examples, logic flow 1000 at block 1004 may receive address information to communicate telemetric data to a management authority for an SDN coupled to the mesh network through at least one of the second wireless device or the third wireless device. For these examples, address component 922-2 may receive the address information.

In some examples, logic flow 1000 at block 1006 may send telemetric data to the management authority based on negotiated session parameters. For these examples, telemetric component 922-5 may send the telemetric data to the management authority.

According to some examples, logic flow 1000 at block 1008 may receive a routing table generated by the management authority, the routing table based, at least in part, on the telemetric data, the routing table for use by the first wireless device to route data within the mesh network or route data to a first network coupled to the mesh network through the second or the third wireless device. For these examples, route component 922-6 may receive the routing table.

FIG. 11 illustrates an embodiment of a storage medium 1100. The storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
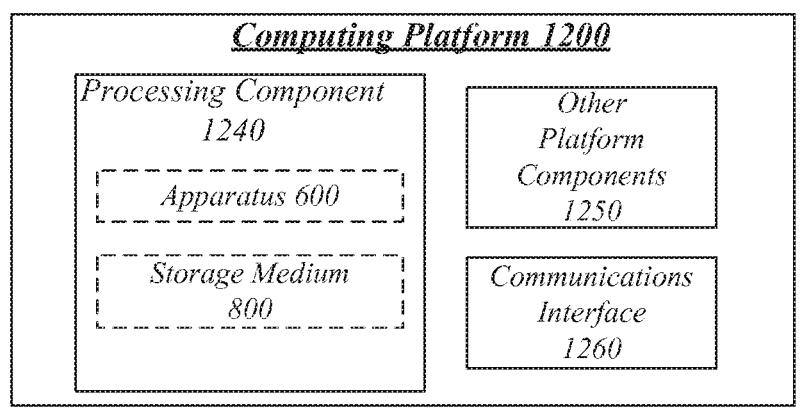
FIG. 12 illustrates an example computing platform.

FIG. 12 illustrates an example computing platform 1200. In some examples, as shown in FIG. 12, computing platform 1200 may include a processing component 1240, other platform components or a communications interface 1260. According to some examples, computing platform 1200 may be part of a server for an SDN as mentioned above.

According to some examples, processing component 1240 may execute processing operations or logic for apparatus 600 and/or storage medium 800. Processing component 1240 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software components, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1250 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1260 may include logic and/or features to support a communication interface. For these examples, communications interface 1260 may include one or more communication interfaces that operate according to various communication protocols or standards to communicate over direct or network communication links. Direct communications may occur via use of communication protocols or standards described in one or more industry standards (including progenies and variants) such as those associated with the SMBus specification or the PCI Express specification. Network communications may occur via use of communication protocols or standards such those described in one or more Ethernet standards promulgated by the IEEE. For example, one such Ethernet standard may include IEEE 802.3-2008, Carrier sense Multiple access with Collision Detection (CSMA/CD) Access Method and Physical Layer Specifications, Published in December 2008 (hereinafter "IEEE 802.3") another standard may include IEEE-802.11-2012. Communication protocols may also include those associated with other standards such as 3GPP LTE standards including LTE-A.

Computing platform 1200 may be part of a computing device that may be, for example, a server, a server array or server farm, a web server, a network server, an Internet server, a distributed computing system, multiprocessor systems, processor-based systems, or combination thereof. Accordingly, functions and/or specific configurations of computing platform 1200 described herein, may be included or omitted in various embodiments of computing platform 1200, as suitably desired.

The components and features of computing platform 1200 may be implemented using any combination of discrete circuitry, application specific integrated circuits (ASICs), logic gates and/or single chip architectures. Further, the features of computing platform 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example computing platform 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 13:
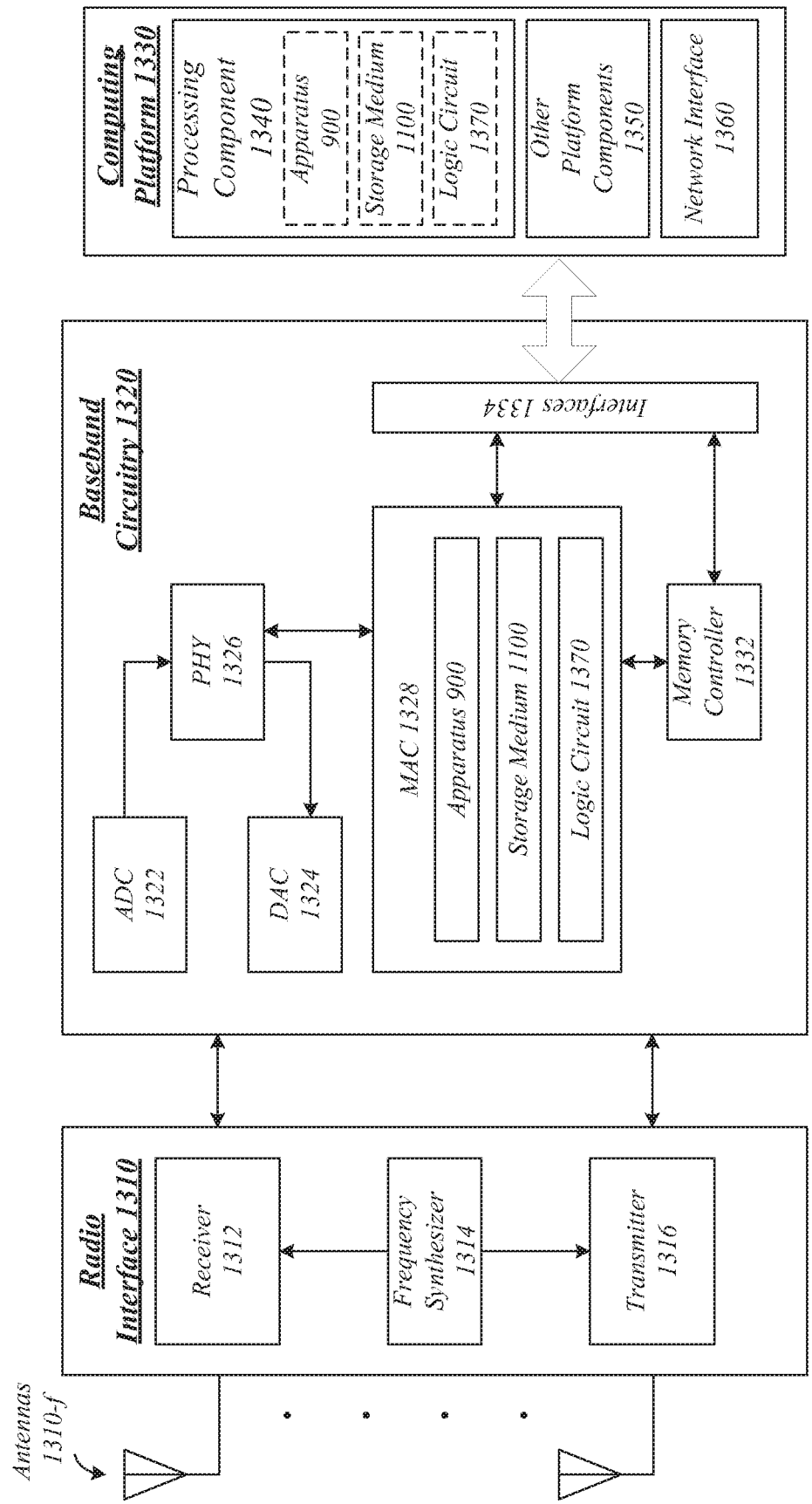
FIG. 13 illustrates an example of a device.

FIG. 13 illustrates an embodiment of a device 1300 for use in a wireless device to couple to a mesh network. Device 1300 may implement, for example, apparatus 900, storage medium 1100 and/or a logic circuit 1370. The logic circuit 1370 may include physical circuits to perform operations described for apparatus 900. As shown in FIG. 13, device 1300 may include a radio interface 1310, baseband circuitry 1320, and computing platform 1330, although examples are not limited to this configuration.

The device 1300 may implement some or all of the structure and/or operations for the apparatus 900, storage medium 1100 and/or logic circuit 1370 in a single computing entity, such as entirely within a single device. Alternatively, the device 1300 may distribute portions of the structure and/or operations for apparatus 900, storage medium 1100 and/or logic circuit 1370 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The examples are not limited in this context.

In one embodiment, radio interface 1310 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 1310 may include, for example, a receiver 1312, a transmitter 1316 and/or a frequency synthesizer 1314. Radio interface 1310 may include bias controls, a crystal oscillator and/or one or more antennas 1315-$f$. In another embodiment, radio interface 1310 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1320 may communicate with radio interface 1310 to process receive and/or transmit signals and may include, for example, an analog-to-digital converter 1322 for down converting received signals, a digital-to-analog converter 1324 for up converting signals for transmission. Further, baseband circuitry 1320 may include a baseband or physical layer (PHY) processing circuit 1326 for PHY link layer processing of respective receive/transmit signals. Baseband circuitry 1320 may include, for example, a processing circuit 1328 for medium access control (MAC)/data link layer processing. Baseband circuitry 1320 may include a memory controller 1332 for communicating with MAC processing circuit 1328 and/or a computing platform 1330, for example, via one or more interfaces 1334.

In some embodiments, PHY processing circuit 1326 may include a frame construction and/or detection module, in combination with additional circuitry such as a buffer memory, to construct and/or deconstruct communication frames (e.g., containing subframes). Alternatively or in addition, MAC processing circuit 1328 may share processing for certain of these functions or perform these processes independent of PHY processing circuit 1326. In some embodiments, MAC and PHY processing may be integrated into a single circuit.

Computing platform 1330 may provide computing functionality for device 1300. As shown, computing platform 1330 may include a processing component 1340. In addition to, or alternatively of, baseband circuitry 1320 of device 1300 may execute processing operations or logic for apparatus 900, storage medium 1100, and logic circuit 1370 using the processing component 1330. Processing component 1340 (and/or PHY 1326 and/or MAC 1328) may comprise various hardware elements, software elements, or a combination of both. Examples of hardware elements may include devices, logic devices, components, processors, microprocessors, circuits, processor circuits (e.g., circuitry 920), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1330 may further include other platform components 1350. Other platform components 1350 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1330 may further include a network interface 1360. In some examples, network interface 1360 may include logic and/or features to support X2, S1-MME or S1-U interfaces as described in one or more 3GPP LTE or LTE-A specifications or standards. For these examples, network interface 1360 may enable an apparatus 1300 or 1300 located at an eNB, MME or SWG to communicatively couple through backhaul, control plane or user plane channels. In some other examples, network interface 1360 may include logic and/or features to support other communication interfaces described in the one or more 3GPP LTE or LTE-A specifications or standards and/or IEEE 802.11-2012 standards. For these examples, network interface 1360 may enable an apparatus 900 located with a wireless device to communicatively couple to one or more other wireless devices, an SDN or an external network via a wireless communications link.

Device 1300 may be, for example, user equipment, a computer, a personal computer (PC), a desktop computer, a laptop computer, an ultrabook computer, a smartphone, a tablet computer, a notebook computer, a netbook computer, wireless access point, or combination thereof. Accordingly, functions and/or specific configurations of device 1300 described herein, may be included or omitted in various embodiments of device 1300, as suitably desired. In some embodiments, device 1300 may be configured to be compatible with protocols and frequencies associated one or more of the 3GPP LTE specifications and/or IEEE 802.11-2012 standards for WLANs, WMANs, and/or other types of wireless networks, although the examples are not limited in this respect.

Embodiments of device 1300 may be implemented using single input single output (SISO) architectures. However, certain implementations may include multiple antennas (e.g., antennas 1315-f) for transmission and/or reception using adaptive antenna techniques for beamforming or spatial division multiple access (SDMA) and/or using multiple input multiple output (MIMO) communication techniques.

The components and features of device 1300 may be implemented using any combination of discrete circuitry, application specific integrated circuits (ASICs), logic gates and/or single chip architectures. Further, the features of device 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1. An example apparatus for a management authority of an SDN may include circuitry. The apparatus may also include a receive component for execution by the circuitry to receive telemetric data from wireless devices coupled together in a mesh network having one or more ad hoc WLAN connections between the wireless devices. The mesh network may be coupled to the management authority through at least one of the wireless devices. The apparatus may also include a table component for execution by the circuitry to generate a routing table to define one or more paths through the one or more ad hoc WLAN connections based, at least in part, on the telemetric data. The apparatus may also include a send component for execution by the circuitry to send the routing table to at least one wireless device coupled to the mesh network for use to route data within the mesh network or route data to a first network coupled to the mesh network.

Example 2. The apparatus of example 1, the telemetric data may include at least one of physical locations of the wireless devices, indication of which of the wireless devices couples to the first network or couples to the management authority, rate and direction of movement information for the wireless devices, power source or battery information for the wireless devices, respective processing workloads used by each of the wireless devices to route data within or outside of the mesh network, or respective QoS guarantees for each of the wireless devices.

Example 3. The apparatus of example 2, the table component may generate the routing table based on a fairness scheme that includes the table component balancing the respective processing workloads used by each of the wireless devices to route data within or outside of the mesh network.

Example 4. The apparatus of example 3, balancing the respective processing workloads may include balancing based on each wireless device sharing substantially equal portions of an overall processing workload for routing data within or outside the mesh network.

Example 5. The apparatus of example 2, the table component may generate the routing table based on information indicating physical terrain characteristics for the physical locations of the wireless devices including hills, mountains, vegetation coverage, buildings, bridges, roads, railroads or tunnels.

Example 6. The apparatus of example 2, the table component may generate the routing table based on a physical location of one or more of the wireless devices from among the wireless devices coupled to the first network or coupled to the SDN via network uplink connections.

Example 7. The apparatus of example 2, the telemetric data including respective QoS guarantees for each of the wireless devices. For these examples, the apparatus may also include a synchronization component for execution by the circuitry to synchronize a time between the wireless devices to facilitate meeting the respective QoS guarantees for each of the wireless devices.

Example 8. The apparatus of example 1, the receive component may receive the telemetric data according to one or more negotiated session parameters that determine frequency and content of the telemetric data received from the wireless devices.

Example 9. The apparatus of example 1 may also include a verify component for execution by the circuitry to verify whether a wireless device from among the wireless devices has a service agreement with the management authority before the table component generates the routing table based on telemetric data received from the wireless device. The apparatus may also include an authenticate component for execution by the circuitry to authenticate an identity of the wireless device that matches an identity for a given wireless device having the service agreement with the management authority. For this example, the table component may generate the routing table with or without telemetric data from the wireless device based on the verification of the service agreement and authentication of the wireless device.

Example 10. The apparatus of example 1, the management authority may reside at a server for the SDN. For this example, the management authority may be capable of providing a control plane for the mesh network via generation of the routing table.

Example 11. The apparatus of example 10, the management authority may also be capable of providing the control plane via one or more management functions including central authentication and verification control for each wireless device to access the mesh network or access the SDN, or virus scanning of data routed through the mesh network.

Example 12. The apparatus of example 1 may also include a service component for execution by the circuitry to receive a request for a service from a wireless device from among the wireless devices and fulfill the request based on at least some of the telemetric data received from the wireless devices.

Example 13. The apparatus of example 12, the telemetric data may include a physical location for the wireless device and the service may include one of locating a charging location to charge a battery for the wireless device, a surface route for the wireless device to travel to reach a given physical location or a physical location of vehicle parking located nearest to the physical location for the wireless device.

Example 14. The apparatus of example 1, the receive component may receive updated telemetric data from the wireless devices coupled together in the mesh network. The table component may then generate an updated routing table based on the updated telemetric data. The send component may then send the updated routing table to the at least one wireless device coupled to the mesh network for use to route data within the mesh network or route data to the first network coupled to the mesh network.

Example 15. The apparatus of example 1, the ad hoc WLAN connections may be configured to operate in compliance with one or more wireless communication standards associated with the IEEE 802.11 standard to include IEEE 802.11-2012.

Example 16. An example method may include receiving telemetric data at a management authority for an SDN. The telemetric data may be received from wireless devices coupled together in a mesh network having one or more ad hoc WLAN connections between the wireless devices, the mesh network coupled to the management authority through at least one of the wireless devices. The method may also include generating a routing table to define one or more paths through the one or more ad hoc WLAN connections based, at least in part, on the telemetric data. The method may also include sending the routing table to at least one wireless device coupled to the mesh network for use to route data within the mesh network or route data to a first network coupled to the mesh network.

Example 17. The method of example 16, the telemetric data may include at least one of physical locations of the wireless devices, indication of which of the wireless devices couples to the first network or couples to the management authority, rate and direction of movement information for the wireless devices, power source or battery information for the wireless devices, respective processing workloads used by each of the wireless devices to route data within or outside of the mesh network, or respective quality of service (QoS) guarantees for each of the wireless devices.

Example 18. The method of example 17, generating the routing table may be based on a fairness scheme that includes balancing the respective processing workloads used by each of the wireless devices to route data within or outside of the mesh network.

Example 19. The method of example 18, balancing the respective processing workloads may include balancing based on each wireless device sharing substantially equal portions of an overall processing workload for routing data within or outside the mesh network.

Example 20. The method of example 17, the routing table may be generated based on information indicating physical terrain characteristics for the physical locations of the wireless devices including hills, vegetation coverage, buildings, bridges, roads, railroads or tunnels.

Example 21. The method of example 17, the routing table may be generated based on a physical location of one or more of the wireless devices from among the wireless devices coupled to the first network or coupled to the SDN via network uplink connections.

Example 22. The method of example 17, the telemetric data may include respective QoS guarantees for each of the wireless devices. For this example, the method may also include synchronizing a time between the wireless devices to facilitate meeting the respective QoS guarantees for each of the wireless devices.

Example 23. The method of example 16, the telemetric data may be received according to one or more negotiated session parameters that determine frequency and content of the telemetric data received from the wireless devices.

Example 24. The method of example 16 may also include verifying whether a wireless device from among the wireless devices has a service agreement with the management authority before generating the routing table based on telemetric data received from the wireless device. The method may also include authenticating an identity of the wireless device that matches an identity for a given wireless device having the service agreement with the management authority. The method may also include generating the routing table with or without telemetric data from the wireless device based on the verification of the service agreement and authentication of the wireless device.

Example 25. The method of example 16, the management authority may reside at a server for the SDN. For this example, the management authority may be capable of providing a control plane for the mesh network via generation of the routing table.

Example 26. The method of example 25, the management authority may also be capable of providing the control plane via one or more management functions including central authentication and verification control for each wireless device to access the mesh network or access the SDN, or virus scanning of data routed through the mesh network.

Example 27. The method of example 15 may also include receiving a request for a service from a wireless device from among the wireless devices. The method may also include fulfilling the request based on at least some of the telemetric data received from the wireless devices.

Example 28. The method of example 27, the telemetric data may include a physical location for the wireless device and the service may include one of locating a charging location to charge a battery for the wireless device, a surface route for the wireless device to travel to reach a given physical location or a physical location of vehicle parking located nearest to the physical location for the wireless device.

Example 29. The method of example 16 may also include receiving updated telemetric data from the wireless devices coupled together in the mesh network. The method may also include generating an updated routing table based on the updated telemetric data. The method may also include sending the updated routing table to the at least one wireless device coupled to the mesh network for use to route data within the mesh network or route data to the first network coupled to the mesh network.

Example 30. The method of example 16, the ad hoc WLAN connections may be configured to operate in compliance with one or more wireless communication standards associated with the IEEE 802.11 standard to include IEEE 802.11-2012.

Example 31. At least one machine readable medium including a plurality of instructions that in response to being executed on a system at a server for the SDN, may cause the system to carry out a method according to any one of examples 16 to 30.

Example 32. An apparatus comprising means for performing the methods of any one of examples 16 to 30.

Example 33. At least one machine readable medium including a plurality of instructions that in response to being executed by a system at a server for an SDN cause the system to receive telemetric data at a management authority for the SDN. The telemetric data may be received from wireless devices coupled together in a mesh network having one or more ad hoc WLAN connections between the wireless devices. The mesh network may be coupled to the management authority through at least one of the wireless devices. The instruction may also cause the system to generate a routing table to define one or more paths through the one or more ad hoc WLAN connections based, at least in part, on the telemetric data. The instruction may also cause the system to send the routing table to at least one wireless device coupled to the mesh network for use to route data within the mesh network or route data to a first network coupled to the mesh network.

Example 34. The at least one machine readable medium of example 33, the telemetric data may include at least one of physical locations of the wireless devices, indication of which of the wireless devices couples to the first network or couples to the management authority, rate and direction of movement information for the wireless devices, power source or battery information for the wireless devices, respective processing workloads used by each of the wireless devices to route data within or outside of the mesh network, or respective quality of service (QoS) guarantees for each of the wireless devices.

35. The at least one machine readable medium of example 34, comprising the routing table generated based on a fairness scheme that includes balancing the respective processing workloads used by each of the wireless devices to route data within or outside of the mesh network.

Example 36. The at least one machine readable medium of example 34, balancing the respective processing workloads comprises balancing based on each wireless device sharing substantially equal portions of an overall processing workload for routing data within or outside the mesh network.

Example 37. The at least one machine readable medium of example 34, the routing table generated may be based on information indicating physical terrain characteristics for the physical locations of the wireless devices including hills, mountains, vegetation coverage, buildings, bridges, roads, railroads or tunnels.

Example 38. The at least one machine readable medium of example 34, the routing table may be generated based on a physical location of one or more of the wireless devices from among the wireless devices coupled to the first network or coupled to the SDN via network uplink connections.

Example 39. The at least one machine readable medium of example 34, the telemetric data may include respective QoS guarantees for each of the wireless devices. For this example, the instructions may also cause the system to synchronize a time between the wireless devices to facilitate meeting the respective QoS guarantees for each of the wireless devices.

Example 40. The at least one machine readable medium of example 33, the telemetric data may be received according to one or more negotiated session parameters that determine frequency and content of the telemetric data received from the wireless devices.

Example 41. The at least one machine readable medium of example 33, the instructions may also cause the system to verify whether a wireless device from among the wireless devices has a service agreement with the management authority before generating the routing table based on telemetric data received from the wireless device. The instruction may also cause the system to authenticate an identity of the wireless device that matches an identity for a given wireless device having the service agreement with the management authority. The instruction may also cause the system to generate the routing table with or without telemetric data from the wireless device based on the verification of the service agreement and authentication of the wireless device.

Example 42. The at least one machine readable medium of example 33, the management authority may reside at a server for the SDN. For this example, the management authority may be capable of providing a control plane for the mesh network via generation of the routing table.

Example 43. The at least one machine readable medium of example 42, the management authority may also capable of providing the control plane via one or more management functions including central authentication and verification control for each wireless device to access the mesh network or access the SDN, or virus scanning of data routed through the mesh network.

Example 44. The at least one machine readable medium of example 33, the instructions may also cause the system to receive a request for a service from a wireless device from among the wireless devices and fulfill the request based on at least some of the telemetric data received from the wireless devices.

Example 45. The at least one machine readable medium of example 44, the telemetric data may include a physical location for the wireless device and the service may include one of locating a charging location to charge a battery for the wireless device, a surface route for the wireless device to travel to reach a given physical location or a physical location of vehicle parking located nearest to the physical location for the wireless device.

Example 46. The at least one machine readable medium of example 33, the instructions may also cause the system to receive updated telemetric data from the wireless devices coupled together in the mesh network. The instruction may also cause the system to generate an updated routing table based on the updated telemetric data. The instruction may also cause the system to send the updated routing table to the at least one wireless device coupled to the mesh network for use to route data within the mesh network or route data to the first network coupled to the mesh network.

Example 47. The at least one machine readable medium of example 33, the ad hoc WLAN connections may be configured to operate in compliance with one or more wireless communication standards associated with the IEEE 802.11 standard to include IEEE 802.11-2012.

Example 48. An example apparatus for a first wireless device may include circuitry. The apparatus may also include an establish component for execution by the circuitry to establish a first ad hoc WLAN connection with a second wireless device to couple to a mesh network having at least a third wireless device coupled to the second wireless device via a second ad hoc WLAN connection The apparatus may also include an address component for execution by the circuitry to receive address information to communicate telemetric data to a management authority for an SDN coupled to the mesh network through at least one of the second wireless device or the third wireless device. The apparatus may also include a telemetric component for execution by the circuitry to send telemetric data to the management authority based on negotiated session parameters. The apparatus may also include a route component for execution by the circuitry to receive a routing table generated by the management authority, the routing table based, at least in part, on the telemetric data. For this example, the routing table may be for use by the first wireless device to route data within the mesh network or route data to a first network coupled to the mesh network through the first, the second or the third wireless device.

Example 49. The apparatus of example 48, the negotiated session parameters may include a frequency for sending telemetric data and content of the telemetric data.

Example 50. The apparatus of example 49, the content of the telemetric data may include at least one of a physical location of the first wireless device, indication of whether the first wireless device couples to the first network or couples to the SDN, rate and direction of movement information for the first wireless device, power source or battery information for the first wireless device, a processing workload used by each of the wireless devices to route data within or outside of the mesh network, or a QoS guarantee of the first wireless devices to route data within or outside of the mesh network.

Example 51. The apparatus of example 48, the second wireless device may be coupled to the SDN. The telemetric component may send the telemetric by causing the telemetric data to be forwarded to the second wireless device and the second wireless device capable of forwarding the telemetric data from the first wireless device to the management authority.

Example 52. The apparatus of example 48, the establish component may establish the first ad hoc WLAN connection by scanning the mesh network to identify a potential ad hoc connection to the second or third wireless devices, authenticating the second wireless device, the third wireless device or the mesh network, and establishing the first ad hoc WLAN connection to the second wireless device based on the authentication.

Example 53. The apparatus of example 48, the address information may be received by the address component from the second wireless device or the third wireless device responsive to a request message sent from the first wireless device following establishment of the first ad hoc WLAN connection by the establish component.

Example 54. The apparatus of example 48 may also include a time component for execution by the circuitry to synchronize a time with at least one of the second wireless device or the third wireless device based on time synchronization information originating from the management authority. For this example, the synchronized time may be for use by the first wireless device to meet a QoS guarantee to route data within the mesh network.

Example 55. The apparatus of example 48 may also include a verify component for execution by the circuitry to receive a verification request from the management authority to determine whether the first wireless device has a service agreement with the management authority. The apparatus may also include an identity component for execution by the circuitry to send identity information responsive to the verification request. The apparatus may also include the route component to receive the routing table based on the first wireless device having the service agreement with the management authority and based on authenticating an identity for the first wireless device that matches a given identity assigned to the service agreement.

Example 56. The apparatus of example 48 may also include a request component for execution by the circuitry to send a service request for a service provided by the management authority and receive a response to the service request based on at least some of the telemetric data sent to the management authority by the telemetric component.

Example 57. The apparatus of example 56, the telemetric data may include a physical location for the first wireless device and the service provided by the management authority may include one of locating a charging location to charge a battery for the first wireless device, a surface route for the first wireless device to travel to reach a given physical location, a physical location of vehicle parking located nearest to a location of the first wireless device.

Example 58. The apparatus of example 48, the telemetric component may be capable of sending updated telemetric data to the management authority based on the negotiated session parameters. For this example, the route component may receive an updated routing table from the management authority based, at least in part, on the updated telemetric data.

Example 59. The apparatus of example 48, the ad hoc WLAN connections may be configured to operate in compliance with one or more wireless communication standards associated with the IEEE 802.11 standard to include IEEE 802.11-2012.

Example 60. An example method may include establishing, at circuitry for a first wireless device, a first ad hoc WLAN connection with a second wireless device to couple to a mesh network having at least a third wireless device coupled to the second wireless device via a second ad hoc WLAN connection. The method may also include receiving address information to communicate telemetric data to a management authority for an SDN coupled to the mesh network through at least one of the first wireless device, the second wireless device or the third wireless device. The method may also include sending telemetric data to the management authority based on negotiated session parameters. The method may also include receiving a routing table generated by the management authority, the routing table based, at least in part, on the telemetric data. For this example, the routing table may be for use by the first wireless device to route data within the mesh network or route data to a first network coupled to the mesh network through the first, the second or the third wireless device.

Example 61. The method of example 60, the negotiated session parameters may include a frequency for sending telemetric data and content of the telemetric data.

Example 62. The method of example 61, the content of the telemetric data may include at least one of a physical location of the first wireless device, indication of whether the first wireless device couples to the first network or couples to the SDN, rate and direction of movement information for the first wireless device, power source or battery information for the first wireless device, a processing workload used by each of the wireless devices to route data within or outside of the mesh network, or a quality of service (QoS) guarantee of the first wireless devices to route data within or outside of the mesh network.

Example 63. The method of example 60, the second wireless device may be coupled to the SDN. For this example, sending the telemetric data may include forwarding the telemetric data to the second wireless device and the second wireless device capable of forwarding the telemetric data from the first wireless device to the management authority.

Example 64. The method of example 60, establishing the first ad hoc WLAN connection may include scanning the mesh network to identify a potential ad hoc connection to the second or third wireless devices, authenticating the second wireless device, the third wireless device or the mesh network, and establishing the first ad hoc WLAN connection to the second wireless device based on the authentication.

Example 65. The method of example 60, the address information to communicate telemetric data to the management authority may be received from the second wireless device or the third wireless device responsive to a request message sent from the first wireless device following establishment of the first ad hoc WLAN connection.

Example 66. The method of example 60 may also include synchronizing a time with at least one of the second wireless device or the third wireless device based on time synchronization information originating from the management authority. For this example, the synchronized time may be for use by the first wireless device to meet a QoS guarantee to route data within the mesh network.

Example 67. The method of example 60 may also include receiving a verification request from the management authority to determine whether the first wireless device has a service agreement with the management authority. The method may also include sending identity information responsive to the verification request. The method may also include receiving the routing table based on the first wireless device having the service agreement with the management authority and based on authenticating an identity for the first wireless device that matches a given identity assigned to the service agreement.

Example 68. The method of example 60 may also include sending a service request for a service provided by the management authority receiving a response to the service request based on at least some of the telemetric data sent to the management authority by the first wireless device.

Example 69. The method of example 68, the telemetric data may include a physical location for the first wireless device and the service provided by the management authority may include one of locating a charging location to charge a battery for the first wireless device, a surface route for the first wireless device to travel to reach a given physical location, a physical location of vehicle parking located nearest to a location of the first wireless device.

Example 70. The method of example 60 may also include sending updated telemetric data to the management authority based on the negotiated session parameters and receiving an updated routing table from the management authority based, at least in part, on the updated telemetric data.

Example 71. The method of example 60, the ad hoc WLAN connections configured to operate in compliance with one or more wireless communication standards associated with the IEEE 802.11 standard to include IEEE 802.11-2012.

Example 72. At least one machine readable medium including a plurality of instructions that in response to being executed by system at a wireless device may cause the system to carry out a method according to any one of examples 60 to 71.

Example 74. An apparatus may include means for performing the methods of any one of examples 60 to 71.

Example 73. At least one machine readable medium may include a plurality of instructions that in response to being executed by a system at a first wireless device may cause the system to establish a first ad hoc WLAN connection with a second wireless device to couple to a mesh network having at least a third wireless device coupled to the second wireless device via a second ad hoc WLAN connection. The instructions may also cause the system to receive address information to communicate telemetric data to a management authority for a software-defined network (SDN) coupled to the mesh network through at least one of the second wireless device or the third wireless device. The instructions may also cause the system to send telemetric data to the management authority based on negotiated session parameters. The instructions may also cause the system to receive a routing table generated by the management authority, the routing table based, at least in part, on the telemetric data. The routing table may be for use by the first wireless device to route data within the mesh network or route data to a first network coupled to the mesh network through the first, the second or the third wireless device.

Example 75. The at least one machine readable medium of example 74, the negotiated session parameters may include a frequency for sending telemetric data and content of the telemetric data.

Example 76. The at least one machine readable medium of example 75, the content of the telemetric data may include at least one of a physical location of the first wireless device, indication of whether the first wireless device couples to the first network or couples to the SDN, rate and direction of movement information for the first wireless device, power source or battery information for the first wireless device, a processing workload used by each of the wireless devices to route data within or outside of the mesh network, or a quality of service (QoS) guarantee of the first wireless devices to route data within or outside of the mesh network.

Example 77. The at least one machine readable medium of example 74, the second wireless device may be coupled to the SDN. For this example, sending the telemetric data may include forwarding the telemetric data to the second wireless device and the second wireless device capable of forwarding the telemetric data from the first wireless device to the management authority.

Example 78. The at least one machine readable medium of example 74, to establish the first ad hoc WLAN connection comprises, scanning the mesh network to identify a potential ad hoc connection to the second or third wireless devices, authenticating the second wireless device, the third wireless device or the mesh network, and establishing the first ad hoc WLAN connection to the second wireless device based on the authentication.

Example 79. The at least one machine readable medium of example 74, the address information may be received from the second wireless device or the third wireless device responsive to a request message sent from the first wireless device following establishment of the first ad hoc WLAN connection.

Example 80. The at least one machine readable medium of example 74, the instructions may also cause the system to synchronize a time with at least one of the second wireless device or the third wireless device based on time synchronization information originating from the management authority. The synchronized time may be for use by the first wireless device to meet a QoS guarantee to route data within the mesh network.

Example 81. The at least one machine readable medium of example 74, the instructions to also cause the system to receive a verification request from the management authority to determine whether the first wireless device has a service agreement with the management authority. The instructions to also cause the system to send identity information responsive to the verification request. The instructions to also cause the system to receive the routing table based on the first wireless device having the service agreement with the management authority and based on authenticating an identity for the first wireless device that matches a given identity assigned to the service agreement.

Example 82. The at least one machine readable medium of example 74, the instructions to also cause the system to send a service request for a service provided by the management authority and receive a response to the service request based on at least some of the telemetric data sent to the management authority by the first wireless device.

Example 83. The at least one machine readable medium of example 82, the telemetric data may include a physical location for the first wireless device and the service provided by the management authority may include one of locating a charging location to charge a battery for the first wireless device, a surface route for the first wireless device to travel to reach a given physical location, a physical location of vehicle parking located nearest to a location of the first wireless device.

Example 84. The at least one machine readable medium of example 74, the instructions to also cause the system to send updated telemetric data to the management authority based on the negotiated session parameters. The instructions to also cause the system to receive an updated routing table from the management authority based, at least in part, on the updated telemetric data.

Example 85. The at least one machine readable medium of example 74, the ad hoc WLAN connections may be configured to operate in compliance with one or more wireless communication standards associated with the IEEE 802.11 standard to include IEEE 802.11-2012.

Example 86. An example apparatus for a first wireless device may include means for establishing, at circuitry for the first wireless device, a first ad hoc WLAN connection with a second wireless device to couple to a mesh network having at least a third wireless device coupled to the second wireless device via a second ad hoc WLAN connection. The apparatus may also include means for receiving address information to communicate telemetric data to a management authority for an SDN coupled to the mesh network through at least one of the first wireless device, the second wireless device or the third wireless device. The apparatus may also include means for sending telemetric data to the management authority based on negotiated session parameters. The apparatus may also include means for receiving a routing table generated by the management authority, the routing table based, at least in part, on the telemetric data. The routing table may be for use by the first wireless device to route data within the mesh network or route data to a first network coupled to the mesh network through the first, the second or the third wireless device.

Example 87. The apparatus of example 86, the negotiated session parameters may include a frequency for sending telemetric data and content of the telemetric data.

Example 88. The apparatus of example 87, the content of the telemetric data may include at least one of a physical location of the first wireless device, indication of whether the first wireless device couples to the first network or couples to the SDN, rate and direction of movement information for the first wireless device, power source or battery information for the first wireless device, a processing workload used by each of the wireless devices to route data within or outside of the mesh network, or a quality of service (QoS) guarantee of the first wireless devices to route data within or outside of the mesh network.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a communications interface circuitry to receive telemetric data from wireless devices coupled together in a mesh network and to send updated telemetric data to at least one wireless device coupled to the mesh network for use to route data within the mesh network or route data to a first network coupled to the mesh network; and
a component circuitry to generate a route to update one or more paths between wireless devices through wireless connections of the mesh network based, at least in part, on updated telemetric data; and
the component circuitry to generate the route based on signal interference from other devices in an area of the mesh network that are outside of the mesh network, the route to route data around areas expected to have substantial signal interference.

2. The apparatus of claim 1, the telemetric data comprising at least one of an indication of which of the wireless devices couples to the first network, rate and direction of movement information for the wireless devices, or power source or battery information for the wireless devices.

3. The apparatus of claim 1, the telemetric data comprising respective processing workloads used by each of the wireless devices to route data within or outside of the mesh network.

4. The apparatus of claim 3, the component circuitry to further generate the route based on a fairness scheme that includes the component circuitry balancing the respective processing workloads used by each of the wireless devices to route data within or outside of the mesh network.

5. The apparatus of claim 4, balancing the respective processing workloads comprises balancing based on each wireless device sharing substantially equal portions of an overall processing workload for routing data within or outside the mesh network.

6. The apparatus of claim 1, the telemetric data comprising physical locations of the wireless devices.

7. The apparatus of claim 6, the component circuitry to further generate the route based on information indicating physical terrain characteristics for the physical locations of the wireless device and based on a physical location of one or more of the wireless devices from among the wireless devices coupled to the first network or coupled to a software-defined network (SDN) via network uplink connections.

8. The apparatus of claim 1, the telemetric data comprising respective quality of service (QoS) guarantees for each of the wireless devices, the apparatus further comprising:
a synchronization component for execution by the circuitry to synchronize a time between the wireless devices to facilitate meeting the respective QoS guarantees for each of the wireless devices.

9. A method comprising:
receiving telemetric data, the telemetric data received from wireless devices coupled together in a mesh network having one or more ad hoc wireless local access network (WLAN) connections between the wireless devices, the telemetric data including at least one of an identifier, location information, device characteristics or connections gathered from the wireless devices of the mesh network;
generating a route to update one or more paths between wireless devices through WLAN connections of the mesh network based, at least in part, on updated telemetric data;
sending updated telemetric data to at least one wireless device coupled to the mesh network for use to route data within the mesh network or route data to a first network coupled to the mesh network; and
generating the route based on signal interference from other devices in an area of the mesh network that are not part of the mesh network, the route to route data around areas expected to have substantial signal interference.

10. The method of claim 9, comprising receiving the telemetric data according to one or more negotiated session parameters that determine frequency and content of the telemetric data received from the wireless devices.

11. The method of claim 9, comprising performing a service based on at least some of the telemetric data received from the wireless devices.

12. The method of claim 11, comprising the telemetric data including a physical location for a wireless device and the service including one of locating a charging location to charge a battery for the wireless device, a surface route for the wireless device to travel to reach a given physical location or a physical location of vehicle parking located nearest to the physical location for the wireless device.

13. A computer program product comprising a non-transitory, machine-readable medium which comprises a plurality of instructions that, in response to being executed by a processor, cause the processor to perform operations, the operations to:
  receive telemetric data, the telemetric data received from wireless devices coupled together in a mesh network having one or more ad hoc wireless local access network (WLAN) connections between the wireless devices, the telemetric data including at least one of an identifier, location information, device characteristics or connections gathered from the wireless devices of the mesh network;
  generate a route to update one or more paths between wireless devices through WLAN connections of the mesh network based, at least in part, on updated telemetric data;
  send updated telemetric data to at least one wireless device coupled to the mesh network for use to route data within the mesh network or route data to a first network coupled to the mesh network; and
  generate the route based on signal interference from other devices in an area of the mesh network that are not part of the mesh network, the route to route data around areas expected to have substantial signal interference.

14. The non-transitory, machine-readable medium of claim 13, wherein the operations comprise operations to receive the telemetric data according to one or more negotiated session parameters that determine frequency and content of the telemetric data received from the wireless devices.

15. The non-transitory, machine-readable medium of claim 13, wherein the operations comprise operations to perform a service based on at least some of the telemetric data received from the wireless devices.

16. The non-transitory, machine-readable medium of claim 15, wherein the telemetric data including a physical location for a wireless device and the service including one of locating a charging location to charge a battery for the wireless device, a surface route for the wireless device to travel to reach a given physical location or a physical location of vehicle parking located nearest to the physical location for the wireless device.

\* \* \* \* \*